(12) United States Patent  (10) Patent No.: US 6,347,593 B1
Moran et al.  (45) Date of Patent: Feb. 19, 2002

(54) MODULAR DETHATCHER AND SEEDER

(75) Inventors: Richard Tadashi Moran, Aurora; Edward T. Biegel, Parker, both of CO (US)

(73) Assignee: BlueBird International, Inc., Denver, CO (US)

( * ) Notice: Subject to any disclaimer, the term of this patent is extended or adjusted under 35 U.S.C. 154(b) by 0 days.

(21) Appl. No.: 09/432,437

(22) Filed: Nov. 2, 1999

(51) Int. Cl.⁷ ................................................ A01C 7/08
(52) U.S. Cl. ........................... 111/133; 172/21; 172/42; 172/123
(58) Field of Search ................................ 111/133, 131, 111/130, 11, 12, 13, 162, 161, 159, 158, 157; 172/123, 42, 35, 21

(56) References Cited

U.S. PATENT DOCUMENTS

| | | | | |
|---|---|---|---|---|
| 437,872 A | * | 10/1890 | Stone | 111/133 |
| 1,500,437 A | * | 7/1924 | Burton | 111/133 |
| 1,546,818 A | * | 7/1925 | Addler | 111/133 |
| 2,788,725 A | * | 4/1957 | Wilkey et al. | 111/133 |
| 3,247,812 A | * | 4/1966 | Luciano et al. | 111/133 |
| 3,810,434 A | * | 5/1974 | van der Lely et al. | 111/133 |
| 3,866,552 A | * | 2/1975 | Leidig | 111/133 |
| 4,003,438 A | * | 1/1977 | van der Lely | 111/133 |
| 4,034,687 A | * | 7/1977 | van der Lely | 111/133 |
| 4,152,993 A | * | 5/1979 | van der Lely et al. | 111/133 |

* cited by examiner

*Primary Examiner*—Christopher J. Novosad
(74) *Attorney, Agent, or Firm*—Dorr, Carson, Sloan & Birney, P.C.

(57) ABSTRACT

A modular dethatcher and seeder includes a housing having a rear opening, a removable rear cover substantially closing the rear opening, and a plurality of tines driven by a motor to rotate about a shaft within the housing. When the device is to be used as a seeder, a seeder attachment is inserted into the rear opening of the housing in place of the rear cover. The seeder attachment can be driven by the rear wheels of the device. Alternatively, when the device is to be used as a dethatcher, a chute can be removably attached to the rear opening and a collection bag is then attached to the chute to hold debris thrown by the tines.

13 Claims, 5 Drawing Sheets

MODULAR DETHATCHER AND SEEDER

BACKGROUND OF THE INVENTION

1. Field of the Invention

The present invention relates generally to the field of lawn equipment. More specifically, the present invention discloses a modular dethatcher and seeder.

2. Statement of the Problem

Dethatchers have long been used to remove dead grass, clippings, and other debris from turf. Otherwise, such debris can accumulate to the point of interfering with the absorption of water, which can retard the growth of grass. This debris can also foster the growth of fungi and other microorganisms that cause lawn diseases.

Conventional dethatchers use a set of tines to comb between the blades of grass and thereby remove debris from the turf. These tines are typically mounted in a radial pattern on a horizontal shaft driven by a small gasoline engine.

Various types of seeders have also been used for many years to sow grass seed. One common type of seeder consists of a wheelmounted, tapered hopper that has a series of holes along its bottom edge. Grass seed gradually falls through these holes as the seeder is rolled along the ground. Some models include a set of rotating blades within the hopper driven by the seeders wheels to help ensure a more even distribution of grass seed. This type of seeder also usually includes an on/off control mounted on the seeder handle connected by a cable to a slide assembly or door assembly that regulates the flow of grass seed through the holes in the bottom of the hopper.

Another type of seeder further includes rotating tines to scratch lines or grooves in the ground to receive the grass seeds. Here again, a gasoline engine is commonly employed to drive a horizontal shaft having a radial arrangement of tines spaced at intervals along the length of the shaft.

Although both dethatchers and seeders have long been widely used, these have heretofore only be considered as separate devices. The owners and operators of golf courses, parks, schools, athletic fields and the like have traditionally purchased separate dethatchers and seeders. This essentially doubles the user's capital expense, and also greatly increases storage and maintenance expenses.

3. Solution to the Problem

The present invention provides a modular device that can be configured either as a dethatcher or a seeder. This allows both functions to be performed by a single device with modular attachments. From the point of view of an equipment manufacturer, the present invention greatly simplifies the manufacturing process for both types of units by providing economies of scale and reducing the inventories of parts required. From the point of view of the end user, the present invention eliminates the need to purchase a separate dethatcher and a separate seeder, which results in substantial savings in initial capital and on-going maintenance costs.

SUMMARY OF THE INVENTION

This invention provides a modular dethatcher and seeder that includes a housing having a rear opening, and a plurality of tines driven by a motor to rotate about a shaft within the housing. When the device is to be used as a seeder, a seeder attachment is inserted into the rear opening of the housing. The seeder attachment is driven by the rear wheels of the device. Alternatively, when the device is to be used as a dethatcher, a chute is removably attached to the rear opening and a catcher bag is then attached to the chute to collect debris thrown by the tines. The device can also be used as a dethatcher without the chute and catcher bag by securing a removable cover over the rear opening.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
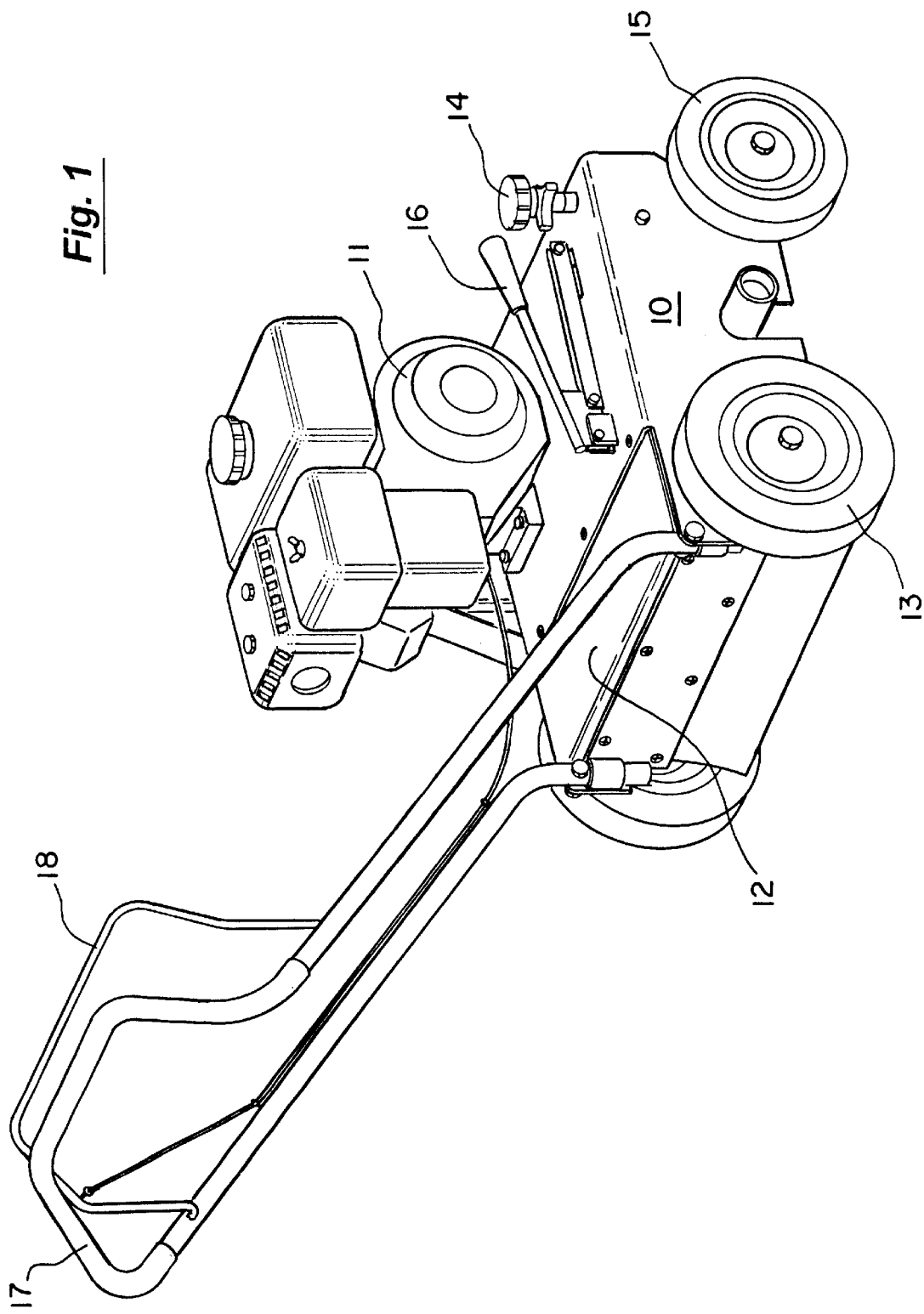
FIG. 1 is a rear perspective view of the present invention configured as a dethatcher without a collection bag.

Turning to FIG. 1, a rear perspective view is shown of the present invention configured as a dethatcher without a collection bag. The device generally includes a housing 10 mounted on a pair of front wheels 15 and a pair of rear wheels 13. A handle 17 enables the user to push the device along the surface of the turf.

Figure 2:
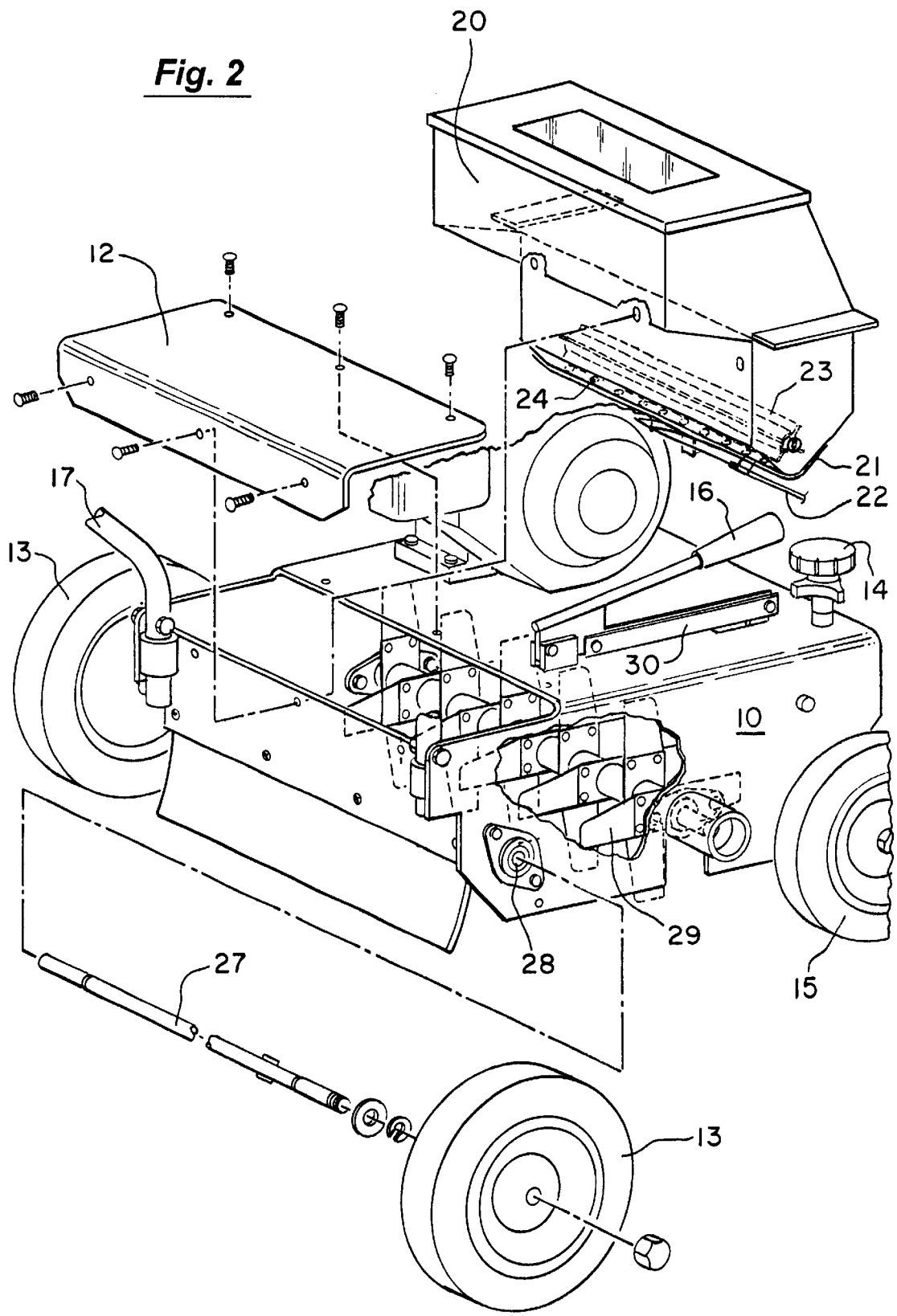
FIG. 2 is an exploded rear perspective view of the rear portion of the device showing a seeder attachment 20 installed in place of the rear cover plate 12.

As shown in FIG. 2, a plurality of dethatching tines 40 are mounted in a radial pattern along the length of a horizontal shaft beneath the housing. For example, twenty dethatching tines 40 can be arranged in ten sets of two tines each spaced at intervals along the length of the shaft. A motor 11 mounted to the housing 10 rotates the shaft and dethatching tines 40. For example, a Briggs & Stratton gasoline engine can be used as the motor 11. The power train between the motor 11 and the dethatching tines 40 includes a clutch controlled by an on/off lever 18 attached to the handle 17, which allows the user to selectively engage or disengage the shaft and dethatching tines 40 to the motor 11.

An opening extends across the rear portion of the housing 10. In the configuration depicted in FIG. 1, a removable rear cover 12 is be attached over the rear opening. The rear cover 12 is also shown in the exploded view provided in FIG. 2. When used in this configuration, the debris dislodged by the dethatching tines 40 is generally contained within the housing 10 and falls on the surface of the turf, where it can be manually gathered by raking.

The elevation of the front wheels 15 (and therefore the dethatching tines 40) can be adjusted by means a height adjustment knob 14. The front wheels 15 can also be moved between a raised position and a lowered position by moving an up/down lever 16 connected by a linkage 30 to the front wheels 15. This feature allows the dethatching tines to be raised out of contact with the ground while the device is being transported. For example, transporting the device over concrete or asphalt with the dethatching tines 40 in the lowered position might damage the tines 40.

Figure 3:
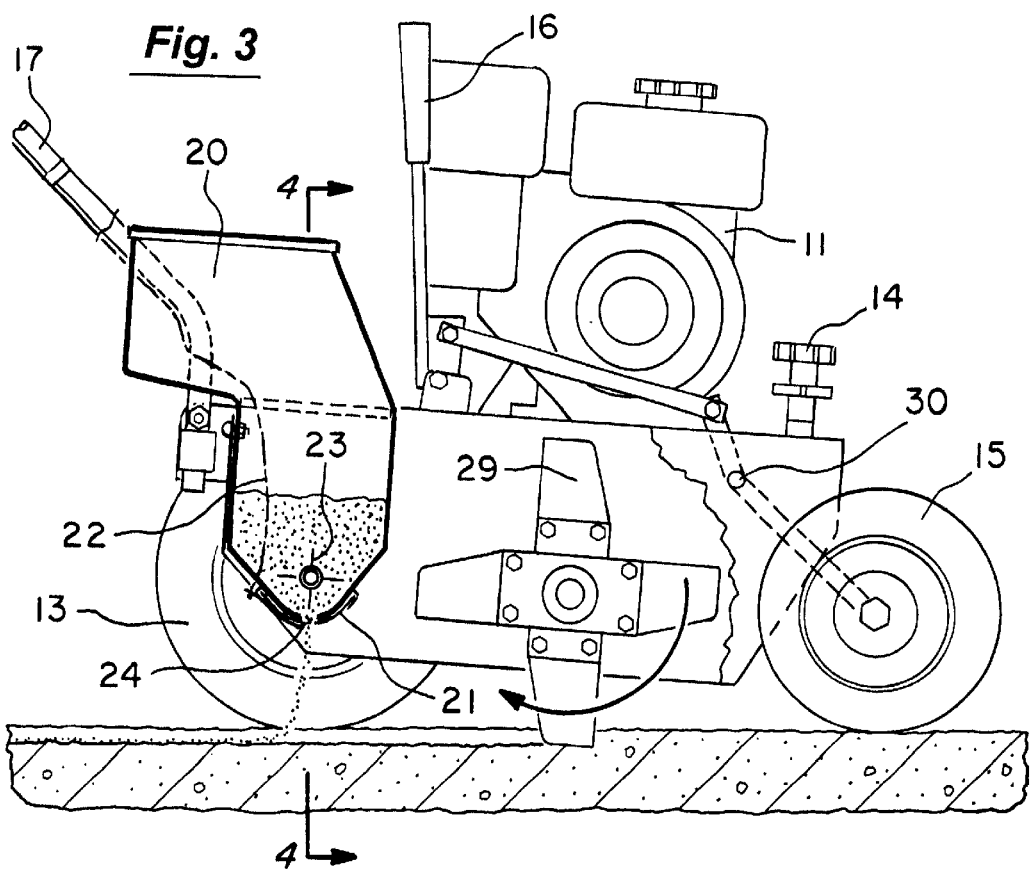
FIG. 3 is a side cross-sectional view of the present invention with the seeder attachment 20.
Figure 4:
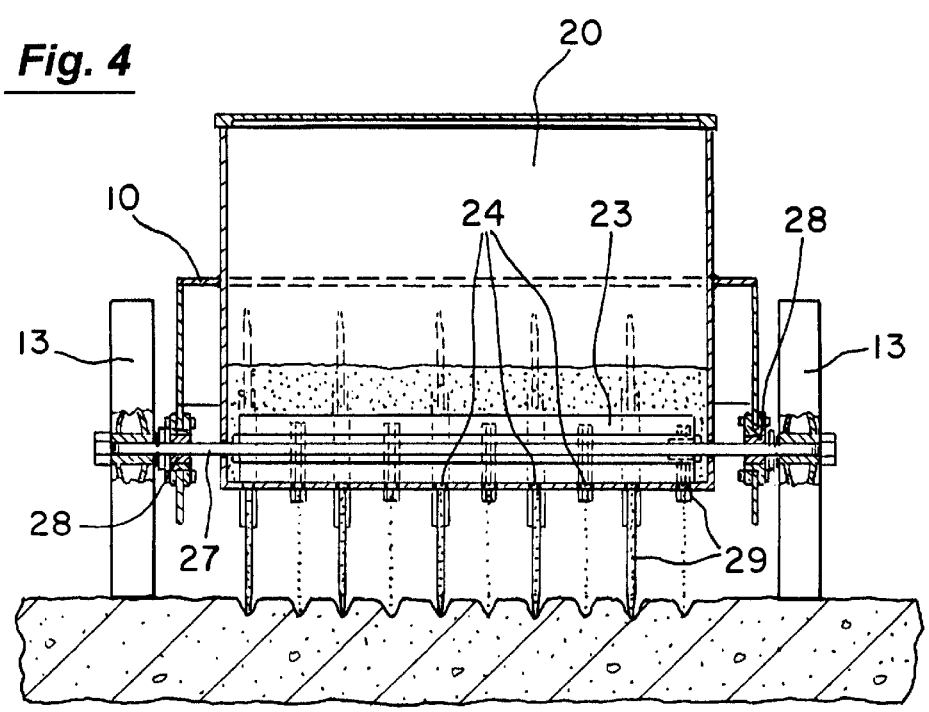
FIG. 4 is another cross-sectional view of the present invention taken along lines 4—4 in FIG. 3.

A second configuration of the present invention as a seeder is illustrated in FIGS. 2 through 4. The seeder attachment 20 is inserted into the rear opening of the housing in place of the rear cover 12, as shown in the exploded rear perspective view of the rear portion of the device provided in FIG. 2. FIG. 3 is a side cross-sectional view of the device with the seeder attachment 20. FIG. 4 is another crosssectional view taken along lines 4—4 in FIG. 3. The seeder 20 includes a hopper for holding a quantity of grass seed. A series of small holes 24 are spaced along the bottom edge of the hopper and allow grass seed to fall to the ground over the width of the seeder 20 at a controlled flow rate. For example, the seeder 20 can be equipped with a series of ten holes 24 that are aligned with the dethatching tines 40, so that the grass seed drops into the grooves or lines cut into the turf by the tines 40, as shown in FIG. 4. A slide assembly 21 connected by a cable 22 to an on/off control 19 mounted on the handle 17 regulates the flow of grass seed through the holes 24 in the bottom of the seeder hopper.

A set of rotating blades 23 within the seeder hopper help to maintain an even feed rate and a more even distribution of the grass seed over the width of the seeder 20. These seeder blades 23 are normally driven, directly or indirectly, by the rear wheels 13. For example, as illustrated in FIG. 2, the rear axle 27 can be removed and inserted through the seeder 20 to drive the seeder blades 23.

In addition to the removable seeder attachment 20, the shaft holding the dethatching tines 40 can also be removed from the housing and replaced with interchangeable assemblies suitable for different types of jobs. For example, the dethatching tines 40 can be replaced with seeder blades 29 having a different shape and dimensions, as depicted in FIGS. 3 and 4.

Figure 5:
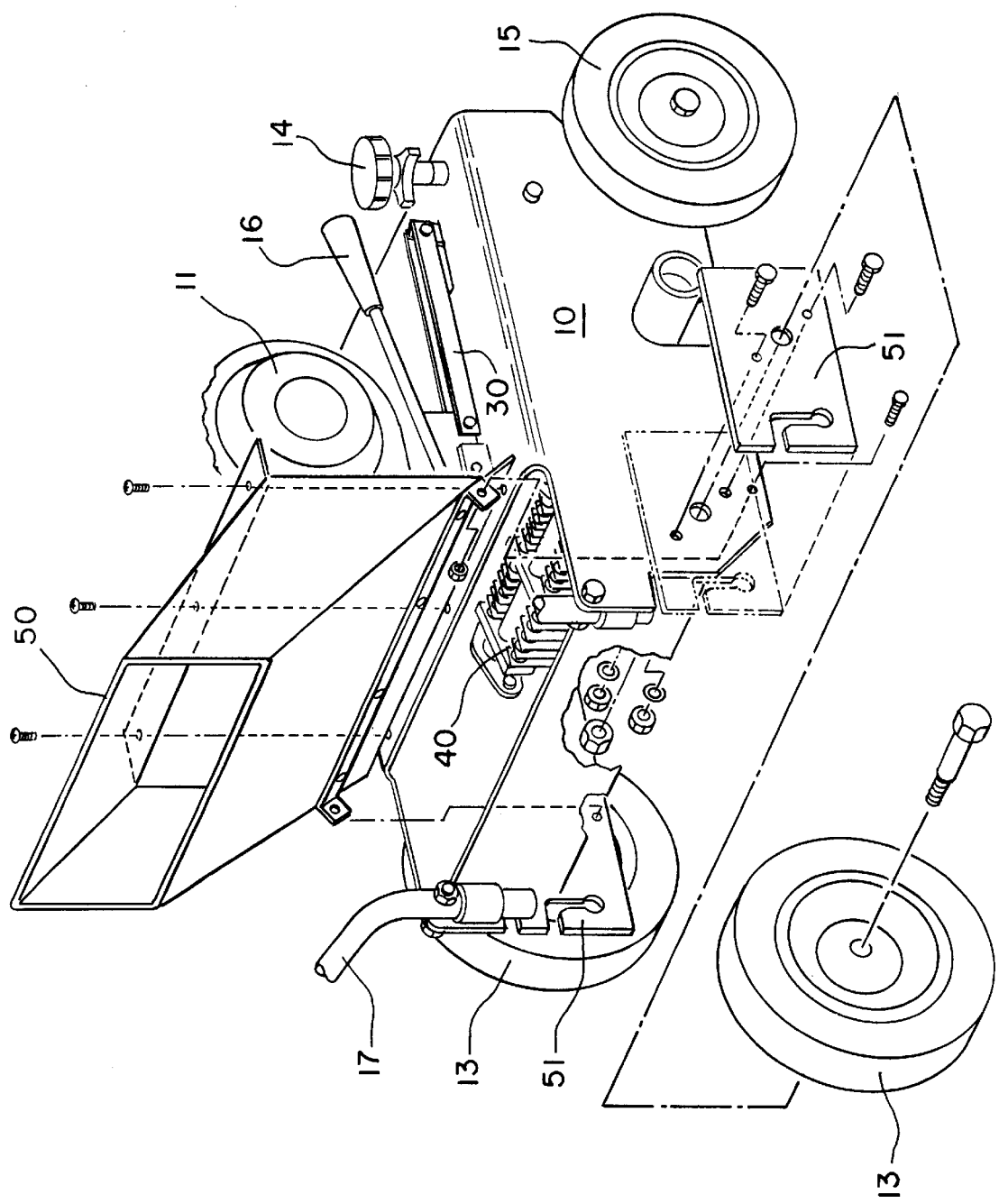
FIG. 5 is an exploded rear perspective view of the rear portion of the device showing installation of a bag attachment chute 50.
Figure 6:
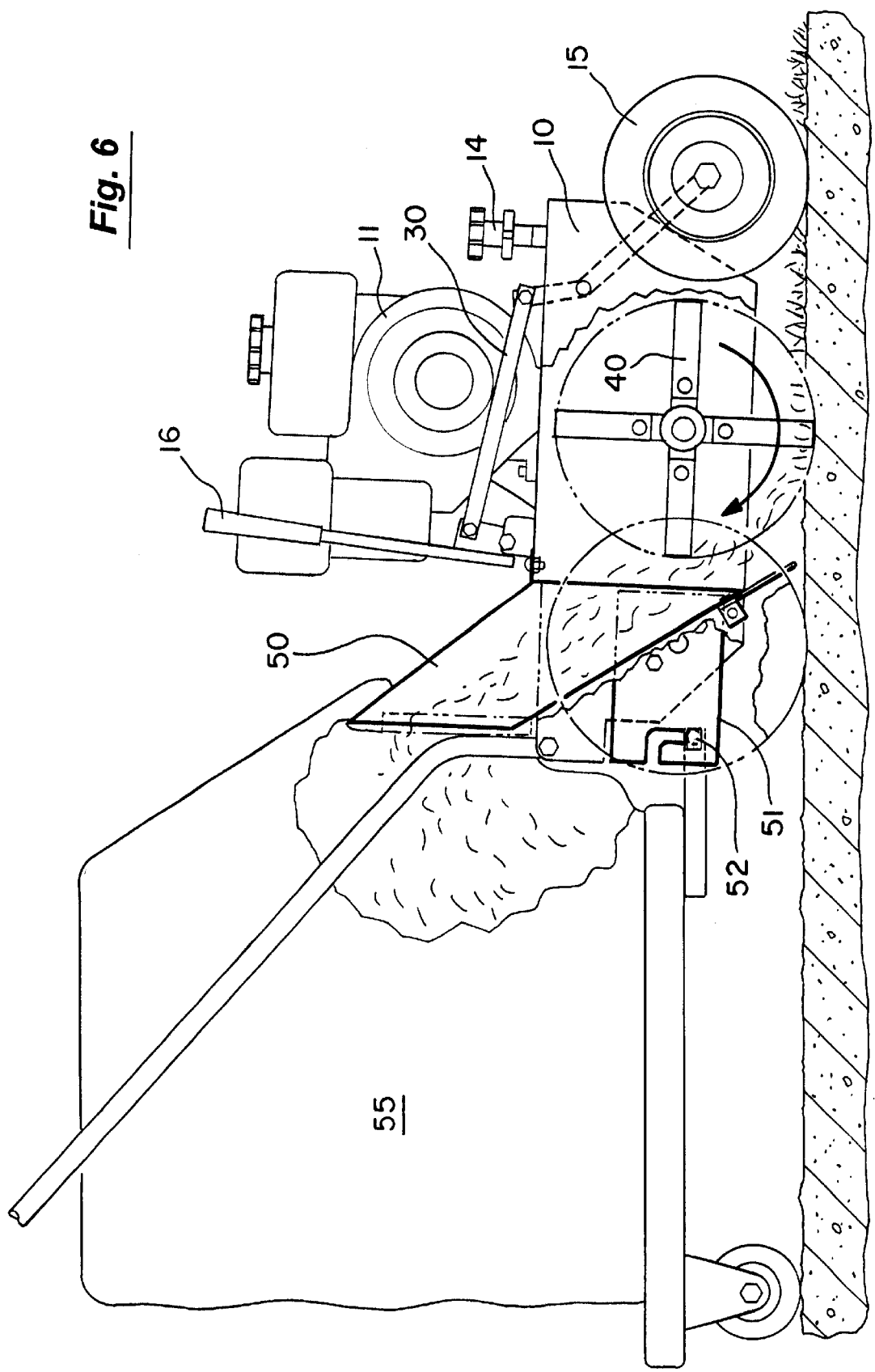
FIG. 6 is a side cross-sectional view of the device with the bag attachment chute 50 and collection bag 55.

A third configuration of the device is shown in FIGS. 5 and 6. Here, the device is used as a dethatcher with a chute 50 removably attached to the rear opening. A collection bag 55 is then attached to the chute 50 to hold debris thrown by the dethatching tines 40. FIG. 5 is an exploded rear perspective view of the rear portion of the device showing installation of the chute 50 in the rear opening of the housing 10. Two attachment plates 51 are also secured to the housing 10 over the rear axle bearings 28. These attachment plates have slots that receive corresponding pins 52 extending from the collection bag 55, and thereby removably secure the collection bag 55 to the chute 50. FIG. 6 is a side cross-sectional view showing the chute 50 and collection bag 55.

The above disclosure sets forth a number of embodiments of the present invention. Other arrangements or embodiments, not precisely set forth, could be practiced under the teachings of the present invention and as set forth in the following claims.

What is claimed is:

1. A modular dethatcher comprising:

a housing having a rear opening;

a removable rear cover substantially closing said rear opening;

a motor;

a plurality of tines driven by said motor to rotate about a shaft within said housing; and a seeder insertable into said rear opening of said housing in place of said rear cover.

2. The modular dethatcher of claim 1 further comprising a plurality of rear wheels supporting said housing adjacent to said rear opening, and wherein said seeder is driven by said rear wheels.

3. The modular dethatcher of claim 2 further comprising an axle extending between said rear wheels, and wherein said seeder further comprises a plurality of rotating blades driven by said axle.

4. The modular dethatcher of claim 1 wherein said seeder further comprises a plurality of holes spaced apart from one another and aligned to drop seeds in grooves cut by said tines in the turf.

5. The modular dethatcher of claim 1 further comprising:

a chute removably attachable to said rear opening in place of said rear cover; and a catcher bag attached to said chute collecting debris thrown by said tines.

6. The modular dethatcher of claim 1 wherein said shaft carrying said tines is removable from said housing.

7. The modular dethatcher of claim 1 further comprising:

a plurality of wheels supporting said housing above the turf; and a height adjustment control for adjusting the elevation of at least some of said wheels with respect to said housing, thereby allowing adjustment of the elevation of said tines with respect to the turf.

8. A modular dethatcher comprising:

a housing having a rear opening;

a plurality of rear wheels supporting said housing adjacent to said rear opening;

a motor;

a plurality of tines driven by said motor to rotate about a shaft within said housing;

a seeder insertable into said rear opening of said housing, said seeder being driven by said rear wheels; and a rear cover to removably close said rear opening when said seeder is removed.

9. The modular dethatcher of claim 8 further comprising an axle extending between said rear wheels, and wherein said seeder further comprises a plurality of rotating blades driven by said axle.

10. The modular dethatcher of claim 8 further comprising:

a plurality of wheels supporting said housing above the turf; and a height adjustment control for adjusting the elevation of at least some of said wheels with respect to said housing, thereby allowing adjustment of the elevation of said tines with respect to the turf.

11. The modular dethatcher of claim 8 wherein said seeder further comprises a plurality of holes spaced apart from one another and aligned to drop seeds in grooves cut by said tines in the turf.

12. The modular dethatcher of claim 8 further comprising:

a chute removably attachable to said rear opening in place of said seeder; and a catcher bag attached to said chute collecting debris thrown by said tines.

13. The modular dethatcher of claim 8 wherein said shaft carrying said tines is removable from said housing.

* * * * *